Oct. 28, 1958         M. M. GUGGENHEIM ET AL         2,857,858
IMPRINTERS FOR CONFECTIONERY MACHINES
Filed Aug. 12, 1955                                3 Sheets-Sheet 1
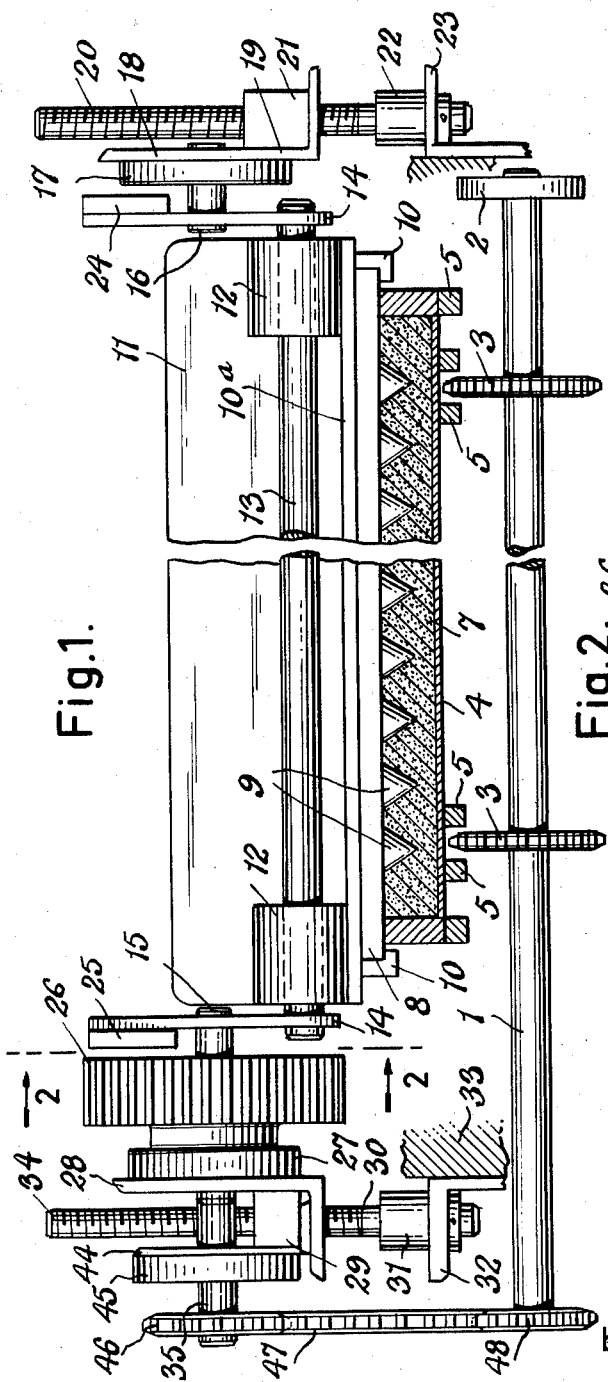
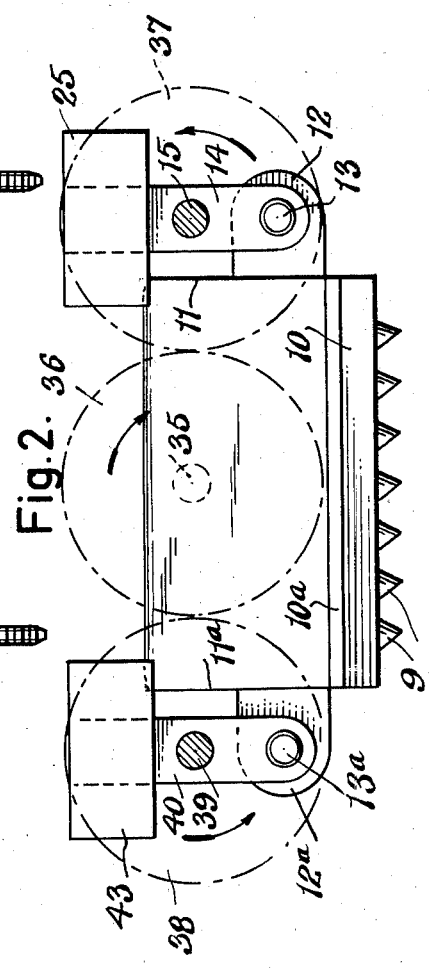
INVENTOR.
Max M. Guggenheim &
Robert L. Greenberg
by Harry Radzinsky
Attorney

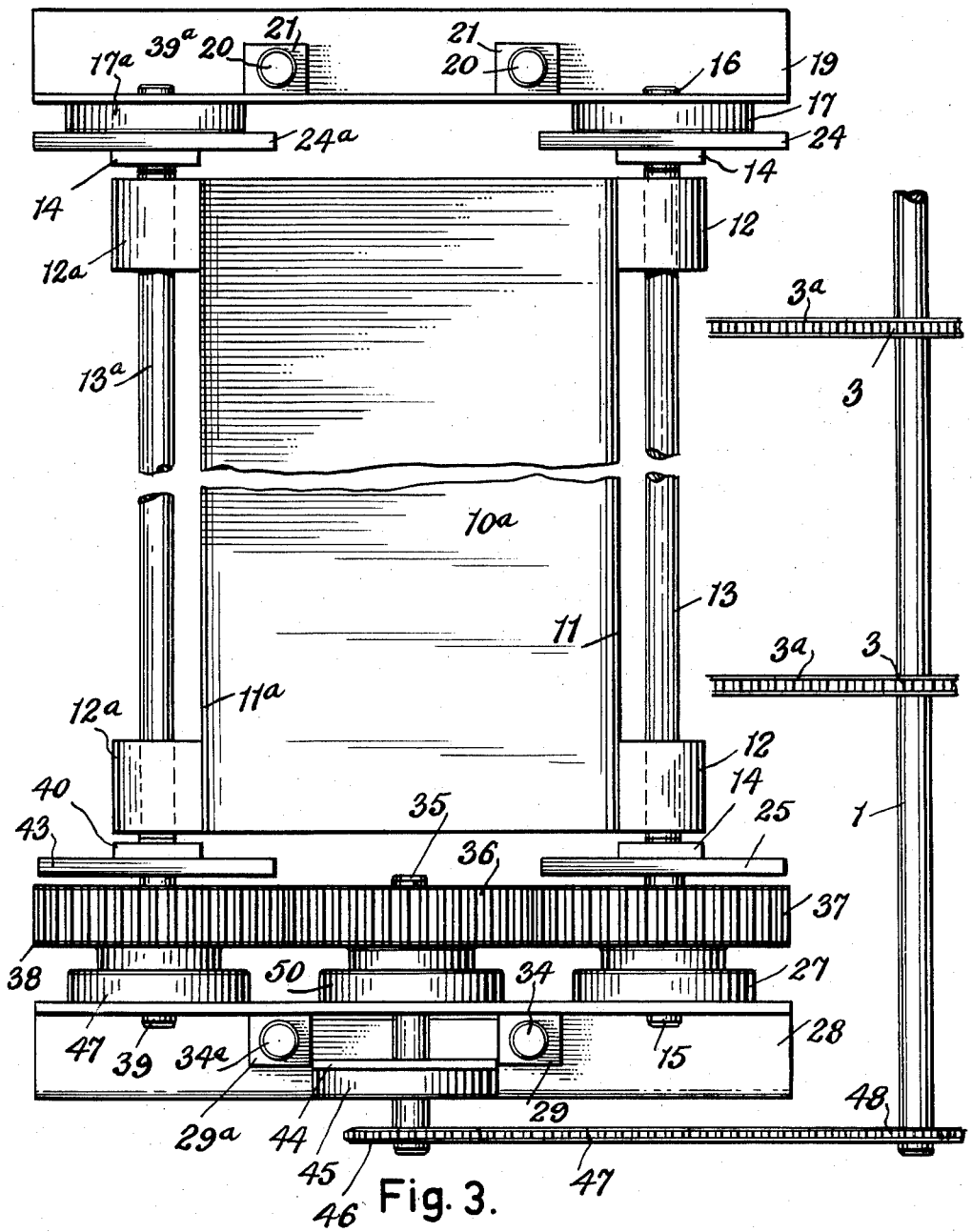

Oct. 28, 1958  M. M. GUGGENHEIM ET AL  2,857,858
IMPRINTERS FOR CONFECTIONERY MACHINES
Filed Aug. 12, 1955  3 Sheets-Sheet 3
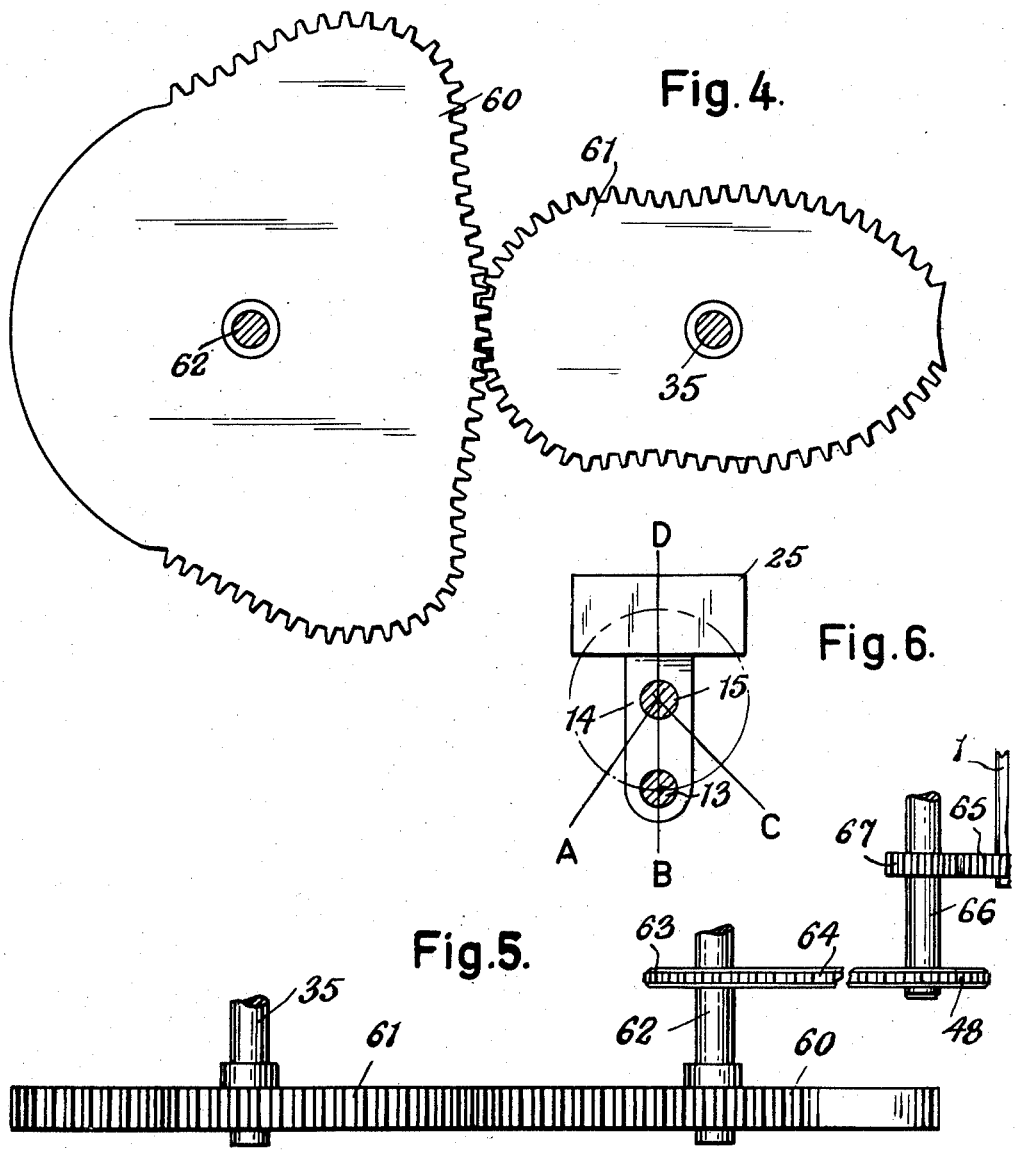
INVENTOR.
Max M. Guggenheim &
Robert L. Greenberg
by
Attorney.

United States Patent Office 2,857,858
Patented Oct. 28, 1958

2,857,858

IMPRINTERS FOR CONFECTIONERY MACHINES

Max M. Guggenheim and Robert L. Greenberg, New York, N. Y., assignors to National Equipment Corporation, New York, N. Y., a corporation of New York Application August 12, 1955, Serial No. 527,913

7 Claims. (Cl. 107—3)

This invention relates to confectionery-making machinery, and particularly to an apparatus known as an imprinter, and which produces a plurality of mold recesses or cavities in mold material, such as starch contained in a mold tray.

In known devices of this character, the trays containing the mold starch are intermittently moved along a support below a cavity-forming mold board which descends during halts or pauses in the movement of the tray, and has projections which enter the starch in the tray to form cavities or recesses therein. Since the imprinting or formation of the mold cavities is done during pauses in the movement of the tray, the starting and stopping of the trays often results in collapse or partial collapse of the mold-cavity walls, thus resulting in the eventual production or misshapen candies. Moreover, the requirement for intermittent movement of the trays materially slows down the imprinting operation.

It is therefore one of the objects of the present invention to provide an imprinter in which movement of the trays is continuous and the imprinting or formation of the mold cavities is done while the trays are in forward movement.

It is an object of the invention to provide an imprinter in which halting of the trays during the imprinting operation is dispensed with and the possible jars which occur on stopping and starting of the trays are eliminated.

It is another object of the invention to provide a simplified imprinting mechanism wherein an imprinter is moved through a circular path and produces mold cavities in the starch contents of a tray that is moved past the imprinter with an uninterrupted linear movement.

It is another object of the invention to provide an imprinter that is moved through a circular path while imprinting mold cavities in a tray moved linearly, with means by which compensation in speed between the imprinter and tray is provided to avoid possible damage to the walls of the mold cavities.

With these and other objects to be hereinafter set forth in view, I have devised the arrangement of parts to be described and more particularly pointed out in the claims appended hereto.

Referring to the accompanying drawings, wherein an illustrative embodiment of the invention is shown, Fig. 1 is an end elevational view, with parts in section, of an imprinter constructed in accordance with the invention;

Fig. 2 is a sectional view, taken substantially on the line 2—2 of Fig. 1, looking in the direction of the arrows with the gearing diagrammatically shown;

Fig. 3 is a top plan view of the imprinter;

Fig. 4 shows a type of gearing employed for securing variable speed of movement of the imprinter;

Fig. 5 shows the gearing of Fig. 4 as applied to the structure of Figs. 1 to 3 inclusive, and Fig. 6 is a diagrammatic view showing the areas of variable movement attained by the imprinter.

The tray 4 carrying the starch 7 in which the mold recesses, or imprinting, is to be produced, is moved continuously and without halt, along supporting rails shown at 5, said tray being moved along on these rails by means of lugs provided on chains 3a extending over sprockets, several of which are disclosed at 3 and which are mounted on a suitable rotatable shaft 1 extending crosswisely of the machine. This means of propelling these trays is known in the art and hence specific details of such propelling means are not shown. It is sufficient to state that the trays are moved along, without halt, below the imprinter 10a which descends to form the mold recesses in the starch contents 7.

In the form shown, the imprinter head 10a is provided on the bottom with the spaced retaining strips 10 which hold a removable mold board 8 between them, said board being provided with a plurality of transverse rows of projections 9 which are forced down into the starch and when lifted therefrom will produce the desired mold recesses in the starch. It will be understood that these projections or mold elements 9 may be made in various shapes according to the shape of the candies to be formed. The imprinter head 10a is provided with upstanding end walls shown respectively at 11 and 11a and projecting from the end wall 11 is a pair of ears 12 which, together with similar ears 12a extending from the end wall 11a, suspend the imprinter head from the shafts shown at 13 and 13a. At each of its ends, the shaft 13 is mounted in a radial or crank arm 14. One of the arms 14, or that on the right end of shaft 13 when viewed in Fig. 1, is secured on a stud shaft 16 rotative in bearing 17 provided on the upstanding flange of an angle bar 19. The angle bar 19 is adjustably supported on threaded posts 20 which adjustably extend through bosses 21 on the angle bar 19, the lower ends of the posts being rotatively mounted in bosses 22 on frame portions 23 secured to a fixed portion of the machine frame. At its end opposite to that at which the shaft 13 is located, the crank arm 14 is provided with a counter weight indicated at 24.

The arm 14 at the opposite end of shaft 13 is mounted on shaft 15 and said arm carries a counter weight, similar to that shown at 24 and indicated at 25. Shaft 15 is rotatively mounted in bearing 27 on the upstanding flange of angle bar 28 which is adjustably mounted on the posts 34 and 34a that threadably extend through the bosses 29 and 29a on the angle bar 28. These posts 34 and 34a have their lower ends 30 rotatively mounted in bosses 31 on frame members 32 secured to some fixed portion 33 of the machine framing.

Mounted on the shaft 15 is a gear 37 in mesh with a gear 36 shown in Fig. 3 and also shown diagrammatically in Fig. 2, and which gear is secured on a shaft 35, rotative in bearings 50 and 45, the bearing 45 being provided on an angle member 44 secured on top of the angle bar 28. Shaft 35 carries a sprocket 46 which connects by the chain 47 with a sprocket 48 provided on the rotative or drive shaft 1.

In mesh with the gear 36 is a gear 38 carried by shaft 39 rotative in bearing 47, which shaft carries a crank-arm 40 provided with the shaft 13a extending through ears 12a on the second end of the imprinter 10a. At its opposite end, the shaft 13a is carried by the arm 14 extending radially from shaft 39a rotative in bearing 17a. Counter balance weight 24a is carried by the arm 14 and a similar weight 43 is carried by the arm 40.

From the foregoing, the operation of the described structure will be readily understood. As shaft 1 is rotated, lugs on the chains 3a will engage against the trays 4 and move each tray along below the imprinter head 10a. Chain 47, rotating shaft 35 through sprocket 46, will cause shaft 35 to be rotated at the rate of one revolution for every tray and will cause both of the two shafts 15 and 39 to be rotated in like direction. The gear 36, mounted on shaft 35, being rotated one revolution per tray, also rotates shafts 15 and 39 at the same rate. Through the crank connection between the shafts 15 and 39 and the imprinter head 10a, an up-and-down or vertical component of movement is imparted to the imprinter head as well as a back-and-forth or horizontal component of movement. The vertical component of movement controls the imprinting action, consisting in pressing the mold members into the starch and then removing them, while the horizontal component of movement controls the travel of the mold board together with that of the tray. Reference is to be had to Fig. 6, in which the travel of the cranks 14 and 40 will be noted. When these cranks are in the position indicated at A, the molds begin to enter the starch and at B, the projections 9 on the mold board have fully entered the starch, and at the position shown at C, the projections are leaving the starch. The positions of points A and C depend upon the height of the depressions to be formed, or in other words, on the height of the candy piece to be molded.

The peripheral speed of the cranks remains constant at the speed of the tray, but the horizontal component decreases on both sides of the point B. The crank center distance, or the distance between the centers of shafts 13 and 15 as shown in Fig. 6, is a function of the distance between the lugs on the tray-moving chains 3 and 3a, the center distance being equal to the distance between lugs divided by $2\pi$. That is why the peripheral speed of the crank is equal to the speed of the tray since the peripheral speed of the crank is a function of the radius of rotation (or center distance between the shafts 13 and 15) and the angular velocity of which is one revolution per tray, as described above. Therefore, when the mold board enters the starch at the point A it is travelling slower than the tray. When the projections on the board have fully entered the starch at point B it is travelling at the same speed as the tray, and when the projections leave the starch at the point C the imprinter is travelling slower than the tray which can result in elongated mold impressions since the horizontal speed of the mold board is less than that of the tray. This difference in relative speeds of the imprinter and tray can be compensated for in two ways. One way is to make the molds with sides which slope sufficiently to allow for the difference in speed without causing damage to the mold recess walls. Another method of speed compensation is attained by varying the rotational speed of the crank so that it maintains a constant horizontal component and therefore equal to the speed of the tray and equal to the speed of the tray at point B.

The required variable speed can be obtained by various arrangements of gearing, an example of which is disclosed in Fig. 4. Therein a gear 60 is secured on a shaft 62 which carries sprocket 63 engaged by the chain 64 that extends to the sprocket 48 on a shaft 66 carrying a gear 67 in mesh with and driven by gear 65 on drive shaft 1. Gear 61 meshes with the interrupted gear shown at 60 which is secured on the shaft 62. Shaft 35 carries the gear 36 that drives gears 37 and 38 as heretofore described to cause rotation of the two shafts 15 and 39 in the same direction. The driven gear 61 is always rotating faster than the driving gear 60, except at the point B where it is going at the same speed, therefore it must be given a corresponding time to go slower or stop completely so that the two gears 60 and 61 maintain the 1:1 timing ratio to produce one print per tray. This is done by the portions of the two gears which are in contact while the mold board is out of the starch. The maximum angle between points A and C is determined by the height of the starch tray. Throughout the rest of the circle the mold board is out of the starch. The rotationable speed of shaft 15 is gradually decreased from A to B, and is gradually increased from B to C, thereby compensating for the reduced horizontal component and in fact maintaining the horizontal component at a constant value equal to the speed at point B. This variable speed effect is attainable by other means, that shown being illustrative of only one way in which the variable speed can be secured.

By means of the arrangement described, the tray is in constant forward movement, while the imprinter, movable through a rotary path, makes the imprints and moves out of the starch. Due to the fact that no halt in movement of the tray is required for the imprinting operation, the production of the molds is greatly accelerated.

Having described a single embodiment of the invention, it is obvious that the same is not to be restricted thereto, but is broad enough to cover all structures coming within the scope of the annexed claims.

What we claim is:

1. In an apparatus of the character described, a drive shaft, conveyor means moved by said drive shaft for continuously moving a starch-containing tray, a pair of shafts located above the conveyor means and rotated at the same speed and in the same direction, means driven by the drive shaft for rotating said shafts, a crank arm fixed on and extending radially from each of said shafts, an axle on each of said crank arms, an imprinter hung from the axles and caused to move downwardly, forwardly, upwardly and then backwardly by movement of the crank arms, a projection-bearing mold board carried by the imprinter and caused to have its projections enter the starch in the tray to form depressions therein and then move upwardly out of the starch by movements of the imprinter as above described, and while the tray is in continuous forward travel by operation of the conveyor means, and means by which compensation in speed between the imprinter and tray is provided to avoid possible damage to the walls of the mold impressions.

2. In an apparatus of the character set forth in claim 1, and including gearing driven by the drive shaft and operatively coupled to the pair of shafts for causing variable movement of the shafts on which the crank arms are fixed to thereby equalize the peripheral movement of the crank arms to the linear movement of the tray and particularly during the entering of the mold projections into the starch and during removal of the same therefrom.

3. In an imprinter of the character described, a continuously-moving tray containing mold-forming material, an imprinter mechanism having an imprinter head provided with projections operative to form mold cavities in the mold while the tray is in movement, said imprinter mechanism including means for carrying the imprinter head forwardly, upwardly, backwardly and downwardly, and including means for maintaining said projections on said head constantly directed toward the tray during the entire path of travel of the imprinter head, and means by which compensation in speed between the imprinter head and tray is provided to avoid possible damage to the walls of the mold cavities.

4. In an imprinter of the character described, a continuously-moving, starch-containing tray, an imprinter mechanism carrying an imprinter head beneath which the tray is linearly moved, means for moving the imprinter head through a circular path while the same forms mold cavities in the starch contents of the tray, said imprinter head carrying projections for forming the cavities, means for carrying the imprinter head in a manner to constantly retain the projections facing toward the tray during the entire circular path of travel of the imprinter head and while the tray is in its linear movement, and means by which compensation in speed between the imprinter head and tray is provided to avoid possible damage to the walls of the mold cavities.

5. In an imprinter of the character described in claim 4, wherein the compensating means for moving the imprinter head is effective to vary the speed of movement of the imprinter during a portion of the arc of movement of the imprinter.

6. In an imprinter of the character described, a continuously-moving, starch-containing mold tray, an imprinter mechanism located above the tray and provided with a head having a plurality of transverse rows of cavity-forming projections, the imprinter mechanism including means for supporting the head and moving the same through a rotary path, said means causing the projections on the head to constantly face the tray during movement of the head through its entire rotary path, whereby the imprinter head will cause its projections to enter the starch, form cavities therein and then move the projections out of the starch while the head is moved through a circular path and while the tray is in an uninterrupted linear movement, and means by which compensation in speed between the imprinter head and tray is provided to avoid possible damage to the walls of the mold cavities.

7. In an imprinter as provided for in claim 6, wherein the means which moves the imprinter head through a circular path is effective to vary the speed of movement of the imprinter during a part of each circular movement to thereby make the speed of movement of the imprinter head co-extensive with the linear movement of the tray during entry of the imprinter head into the starch and during removal of the imprinter head therefrom.

References Cited in the file of this patent

UNITED STATES PATENTS

| | | |
|---|---|---|
| 1,781,345 | Savy et al. | Nov. 11, 1930 |
| 1,916,960 | Bausman | July 4, 1933 |
| 2,288,908 | Kretchman | July 7, 1942 |
| 2,679,215 | Truesdell | May 25, 1954 |

FOREIGN PATENTS

| | | |
|---|---|---|
| 12,868 | Great Britain | Aug. 16, 1890 |